R. HILL.
Assignor, by mesne assignments, of one-half to E. W. COFFIN.
Spark Arrester.
No. 9,524. Reissued Jan. 4, 1881.
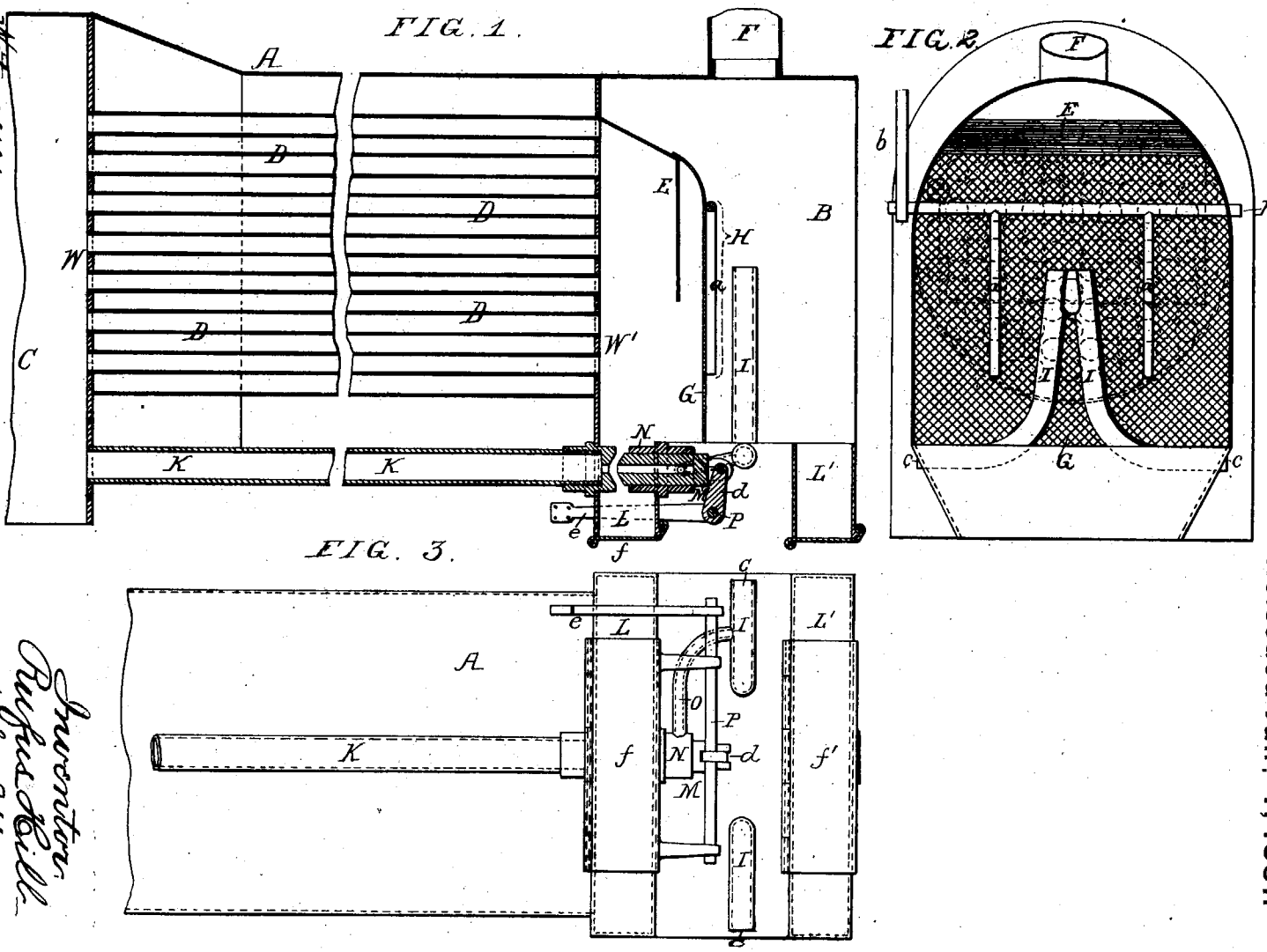
Witnesses.
D. Williams
James T. Tobin
Inventor.
Rufus Hill
by his Attorneys.
Howson and Son
N. PETERS, PHOTO-LITHOGRAPHER, WASHINGTON, D. C.

UNITED STATES PATENT OFFICE.

RUFUS HILL, OF CAMDEN, NEW JERSEY, ASSIGNOR, BY MESNE ASSIGNMENTS, OF ONE-HALF TO EDWARD W. COFFIN, OF SAME PLACE.

SPARK-ARRESTER.

SPECIFICATION forming part of Reissued Letters Patent No. 9,524, dated January 4, 1881.

Original No. 152,375, dated June 23, 1874. Application for reissue filed November 11, 1880.

*To all whom it may concern:*

Be it known that I, RUFUS HILL, a citizen of the United States, residing in Camden, county of Camden, and State of New Jersey, have invented certain Improvements in Spark-Arresters, of which the following is a specification.

My invention consists, first, of the combination of a locomotive smoke-box with a check-plate for directing the sparks and cinders to the bottom of the said smoke-box, for equalizing the draft through the flue-tubes, and for the further purpose of dispensing with the usual lift-pipe; secondly, of the combination of the said check-plate with a screen, for preventing the sparks from passing upward to the chimney; thirdly, of the combination of the screen with a device for striking the same, and thereby cleaning the meshes from matter which is liable to choke them; and, fourthly, my invention consists of an injector connected by pipes to the exhaust-pipes of the steam-engine and with the fire-box, for directing the sparks and cinders to the latter.

In the accompanying drawings, Figure 1 is a vertical section of part of a locomotive-boiler, showing my improvements; Fig. 2, a vertical section of the smoke-box and of the boiler on the line 1 2, and Fig. 3 an inverted plan view of Fig. 1.

A is the body or barrel of the boiler; B, the smoke-box; C, part of the fire-box, and D the usual tubes secured to the tube-plate W of the fire-box and tube-plate W′ of the smoke-box.

E is the check-plate, extending at the top transversely across the smoke-box and from the tube-sheet W′ outward and downward, substantially as shown, so that the sparks cannot pass directly upward; and it is essential to this part of my invention that the check-plate should extend downward below the outlet of the exhaust-pipes I I; otherwise the heavy sparks would come under the direct influence of the exhaust-steam, whereas if the check-plate extends below the outlet of the exhaust-pipes, as shown, these sparks will be deflected downward by the check-plate. At the same time the smoke and gases will be free to pass off to the chimney. This check-plate serves the additional purpose of equalizing the draft through the system of flue-tubes by checking the draft through the upper series of tubes, and as the check-plate extends downward below the outlet of the exhaust-pipes I I, I am enabled to dispense with the usual lift-pipe.

G is a screen of wire-cloth or perforated plate, so situated in respect to the check-plate that all the larger sparks which pass beneath the latter must be arrested by the said screen, through which, however, the smoke can pass freely. As the meshes of the screen are apt to become choked with tarry matter, I provide a striker, H, having any desired number of arms, *a*, projecting downward from a shaft, which has its bearings in the opposite sides of the smoke-box, and which can be so operated by the lever *b* as to cause the arms to strike the screen with sufficient force to detach the obstructions from the meshes.

I I are the exhaust-pipes, which receive the exhaust-steam at their outer lower ends, *c c*, the main portion of this steam passing into the chimney F for increasing the draft.

A pipe, K, communicates at one end with the fire-box of the boiler, and at the opposite end with a receptacle, L, on the under side of the smoke-box.

On the smoke-box end of the pipe is a seat for a tubular valve, M, which can be moved to and fro in its tubular guide N by operating the arm *e*, secured to a shaft, P, having an arm, *d*, connected to the valve, the arm *e* being combined with operating appliances within reach of the engineer. The guide N, as well as the valve, communicates with one of the exhaust-pipes through a pipe, O, so that when the valve has been moved back from its seat the rush of steam through the said valve, through the seat, and through the pipe K will induce the sparks to pass through the latter into the fire-box. Some of the sparks, however, will fall into the bottom of the receptacle L, provided with a hinged bottom, *f*, on opening which the accumulated sparks may be discharged onto the track. There is also a receptacle, L′, beneath the smoke-box for receiving such small particles of fuel as may pass through the screen, and this receptacle also is provided with a hinged bottom.

By the interposition of the screen between the deflector and exhaust-pipes I am enabled to dispense with the usual spark-arrester on the top of the chimney.

I claim as my invention—

1. The combination of the smoke-box with a check-plate, E, which forms, with the tube-plate W′, a space closed at the top, and which extends downward below the outlet of the exhaust-pipe, all substantially as set forth.

2. The combination, in the smoke-box of a locomotive-boiler, of the check-plate E with a screen, substantially as described.

3. The combination of the screen with the striker H, substantially as set forth.

4. The combination of the chamber L of the smoke-box, the tubular valve M, guide N for the same, and the exhaust-pipes I O, substantially as and for the purpose set forth.

In testimony whereof I have signed my name to this specification in the presence of two subscribing witnesses.

RUFUS HILL.

Witnesses:
JAMES F. TOBIN,
HARRY SMITH.